United States Patent
Dong (10) Patent No.: US 10,937,047 B2
(45) Date of Patent: Mar. 2, 2021

(54) RECOMMENDING USER INFORMATION

(71) Applicant: BEIJING SANKUAI ONLINE TECHNOLOGY CO., LTD, Beijing (CN)

(72) Inventor: Shangxian Dong, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 232 days.

(21) Appl. No.: 16/071,549

(22) PCT Filed: Jan. 20, 2017

(86) PCT No.: PCT/CN2017/071979
§ 371 (c)(1),
(2) Date: Jul. 20, 2018

(87) PCT Pub. No.: WO2017/125083
PCT Pub. Date: Jul. 27, 2017

(65) Prior Publication Data
US 2019/0026766 A1     Jan. 24, 2019

(30) Foreign Application Priority Data
Jan. 22, 2016   (CN) .......................... 201610046826.0

(51) Int. Cl.
*G06Q 30/02*  (2012.01)
*G06F 16/435* (2019.01)
(Continued)

(52) U.S. Cl.
CPC ....... *G06Q 30/0224* (2013.01); *G06F 16/435* (2019.01); *G06F 16/9535* (2019.01);
(Continued)

(58) Field of Classification Search
CPC ....................... G06Q 30/0224; G06Q 30/0255
See application file for complete search history.

(56) References Cited

U.S. PATENT DOCUMENTS

| 8,996,035 | B2 * | 3/2015 | Busch | H04L 67/22 |
| | | | | 455/456.3 |
| 2007/0265921 | A1 * | 11/2007 | Rempe | G06Q 30/0214 |
| | | | | 705/14.16 |

(Continued)

FOREIGN PATENT DOCUMENTS

| CN | 103077490 A | 5/2013 |
| CN | 103327045 A | 9/2013 |

(Continued)

OTHER PUBLICATIONS

State Intellectual Property Office of the People's Republic of China, Notification of rejection of decision Issued in Application No. 201610046826.0, dated May 31, 2017, 6 pages (Submitted with Partial Translation).

(Continued)

*Primary Examiner* — Azam A Ansari
(74) *Attorney, Agent, or Firm* — Greenblum & Bernstein, P.L.C.

(57) ABSTRACT

A method and a device for recommending user information are provided. According to an example, the method includes: an identification of a consumption coupon of a first user is received; a corresponding shop identification is obtained based on the identification of the consumption coupon; a second user is determined based on the shop identification; user information of the second user is obtained and the user information of the second user is recommended to the first user.

7 Claims, 2 Drawing Sheets

(51) Int. Cl.
*G06F 16/9535* (2019.01)
*G06Q 50/00* (2012.01)

(52) U.S. Cl.
CPC ......... *G06Q 30/02* (2013.01); *G06Q 30/0255* (2013.01); *G06Q 50/01* (2013.01)

(56) References Cited

U.S. PATENT DOCUMENTS

| | | | |
|---|---|---|---|
| 2010/0125490 | A1* | 5/2010 | Kiciman ................ G06Q 30/02 705/14.1 |
| 2013/0191195 | A1* | 7/2013 | Carlson .............. G06Q 30/0224 705/14.17 |
| 2015/0046458 | A1 | 2/2015 | Hu |
| 2015/0242497 | A1 | 8/2015 | He et al. |

FOREIGN PATENT DOCUMENTS

| | | |
|---|---|---|
| CN | 103810192 A | 5/2014 |
| CN | 104572937 A | 4/2015 |
| CN | 104881802 A | 9/2015 |
| CN | 105096151 A | 11/2015 |
| CN | 105208068 A | 12/2015 |
| CN | 105741131 A | 7/2016 |

OTHER PUBLICATIONS

State Intellectual Property Office of the People's Republic of China, Notification of reexamination Issued in Application No. 201610046826.0, dated Aug. 1, 2018, 4 pages (Submitted with Partial Translation).
International Search Report (in English and Chinese) and Written Opinion of the International Searching Authority (in Chinese) issued in PCT/CN2017/071979, dated Apr. 27, 2017; ISA/CN.
State Intellectual Property Office of the People's Republic of China, Office Action and Search Report Issued in Application No. 201610046826.0, dated Jan. 16, 2017, 7 pages, with English translation.

* cited by examiner

RECOMMENDING USER INFORMATION

CROSS REFERENCE TO RELATED APPLICATIONS

This application is a 371 National Phase of PCT/CN2017/071979 filed Jan. 20, 2017 and published in Chinese as WO 2017/125083 A1 on Jul. 27, 2017, which claims priority to Chinese Patent Application No. 201610046826.0, entitled "METHOD AND DEVICE FOR RECOMMENDING USER INFORMATION", and filed on Jan. 22, 2016. The entire disclosures of the above applications are incorporated herein by reference.

TECHNICAL FIELD

The present disclosure relates to recommending user information in an internet communication field.

BACKGROUND

At present, users often log in a social network and communicate with friends in the social network. To allow a user to make more friends through the social network, a server may recommend information of other users to a user terminal so that the user can know the recommended users and make friends with them.

A method of recommending user information may include that: a server obtains other users of a same gender or the other gender who are in a same age segment and in a same geographical region based on information such as age, gender and geographical location of the user and recommends the information of the obtained other users to the user.

When recommending the information of the other users to the user based on the information such as age, gender, and geographical location of the user, the server may recommend a large number of friends. If all the recommended friends send messages to the user, the user may be bothered. Since the other users recommended by the server may have less common points with the user, it may be poorly in reference. Thus, it is very difficult for the user to know real friends with whom the user has common topics from the recommended other users.

SUMMARY

Based on this, one of the objectives of examples of the present disclosure is to improve the reference of recommended user information.

At the first aspect, a method of recommending user information is provided by an example of the present disclosure. The method includes:

receiving an identification of a consumption coupon of a first user;

obtaining a corresponding shop identification based on the identification of the consumption coupon;

determining a second user based on the shop identification;

obtaining user information of the second user; and recommending the user information of the second user to the first user.

Where, obtaining the corresponding shop identification based on the identification of the consumption coupon includes:

obtaining a stored consumption coupon list; and querying a shop identification corresponding to the consumption coupon in the consumption coupon list based on the identification of consumption coupon.

Where, determining the second user based on the shop identification includes:

invoking a shop association list corresponding to the shop identification based on the shop identification; and determining the second user from the shop association list based on a customized rule corresponding to the first user.

In an example of the present disclosure, the method further includes:

determining a consumption-coupon-denomination corresponding to the consumption coupon based on the identification of the consumption coupon;

determining a recommended number of times corresponding to the first user based on the consumption-coupon-denomination and a preset single-time recommended quota;

generating shop association information corresponding to the first user based on the user identification of the first user, the shop identification and the recommended number of times; and storing the shop association information corresponding to the first user in the shop association list corresponding to the shop identification.

In an example of the present disclosure, the method further includes:

subtracting 1 from a recommended number of times in shop association information corresponding to the second user from the shop association list corresponding to the shop identification;

determining whether the recommended number of times corresponding to the second user after an operation of subtracting 1 is 0; and if the recommended number of times corresponding to the second user after operation of subtracting 1 is 0, deleting the shop association information corresponding to the second user from the shop association list.

Where, obtaining the user information of the second user and recommending the user information of the second user to the first user includes:

obtaining a user identification of the second user and historic shop information corresponding to the second user;

generating the user information of the second user based on the user identification of the second user and the historic shop information; and sending the user information of the second user and a preset displaying manner to the first user, wherein the preset displaying manner comprises a flop animation manner and a ripple gradient animation manner.

In an example of the present disclosure, the method further includes:

determining a current position of the second user; and sending chance encounter prompting information to the first user and the second user when it is determined that the current position of the second user as a shop corresponding to the shop identification.

At the second aspect, an example of the present disclosure provides a device for recommending user information. The device includes a processor which invokes machine readable instructions corresponding to a control logic for recommending user information stored on a storage medium and executes the machine readable instructions to:

receive an identification of a consumption coupon of a first user;

obtain a corresponding shop identification based on the identification of the consumption coupon;

determine a second user based on the shop identification;

obtain user information of the second user; and recommend the user information of the second user to the first user.

In an example of the present disclosure, when obtaining the corresponding shop identification based on the identification of the consumption coupon, the machine readable instructions cause the processor to:

obtain a stored consumption coupon list; and query a shop identification corresponding to the consumption coupon in the consumption coupon list based on the identification of consumption coupon.

In an example of the present disclosure, when determining the second user based on the shop identification, the machine readable instructions cause the processor to:

invoke a shop association list corresponding to the shop identification based on the shop identification; and determine the second user from the shop association list based on a customized rule corresponding to the first user.

In an example of the present disclosure, the machine readable instructions cause the processor to:

determine a consumption-coupon-denomination corresponding to the consumption coupon based on the identification of the consumption coupon;

determine a recommended number of times corresponding to the first user based on the consumption-coupon-denomination and a preset single-time recommended quota;

generate shop association information corresponding to the first user based on the user identification of the first user, the shop identification and the recommended number of times; and store the shop association information corresponding to the first user in the shop association list corresponding to the shop identification.

In an example of the present disclosure, the machine readable instructions cause the processor to:

subtract 1 from a recommended number of times in shop association information corresponding to the second user from the shop association list corresponding to the shop identification;

determine whether the recommended number of times corresponding to the second user after an operation of subtracting 1 is 0; and if the recommended number of times corresponding to the second user after operation of subtracting 1 is 0, delete the shop association information corresponding to the second user from the shop association list.

In an example of the present disclosure, when obtaining the user information of the second user and recommending the user information of the second user to the first user, the machine readable instructions cause the processor to:

obtain a user identification of the second user and historic shop information corresponding to the second user;

generate the user information of the second user based on the user identification of the second user and the historic shop information; and send the user information of the second user and a preset displaying manner to the first user, wherein the preset displaying manner comprises a flop animation manner and a ripple gradient animation manner.

In an example of the present disclosure, the machine readable instructions cause the processor to:

determine a current position of the second user; and send chance encounter prompting information to the first user and the second user when it is determined that the current position of the second user as a shop corresponding to the shop identification.

In the methods and devices provided by examples of the present disclosure, an identification of a consumption coupon of a first user is received; a corresponding shop identification is determined based on the identification of the consumption coupon; a second user is determined based on the shop identification; user information of the second user is recommended to the first user. When an identification of a consumption coupon of the first user in a shop is received, the second users of the shop are recommended to the first user. The second users are users making payments in the shop. Therefore, the recommended number of the second users is limited and the second users are likely to have consumption tastes and lifestyles similar to those of the first user. Due to consumption limitation, the possibility of recommending malicious users to the first user may be reduced, thereby improving the reference of recommended user information. The first user may know real friends with whom the first user has common topics from the recommended users.

BRIEF DESCRIPTION OF THE DRAWINGS

To describe the technical solutions of the examples of the present disclosure more clearly, brief descriptions will be made below to the accompany drawings required by the examples of the present disclosure. It is understood that the following drawings merely illustrate some examples of the present disclosure and therefore shall not be regarded as limitation to the scope of protection of the present disclosure. Those skilled in the art may also obtain other relevant drawings based on these drawings without paying creative work.

DETAILED DESCRIPTION OF THE EMBODIMENTS

The technical solutions of the examples of the present disclosure will be described clearly and completely in combination with the accompany drawings in the examples of the present disclosure. Apparently, the described examples are merely part of the examples of the present disclosure rather than all examples. Usually, a component described in the accompanying drawings in an example of the present disclosure may be arranged and designed in different configurations. Therefore, the following detailed descriptions for the examples shown in the drawings are not intended to limit the scope of protection of the present disclosure but merely represent some selected examples of the present disclosure. Other examples obtained by those skilled in the art based on the examples of the present disclosure without paying creative work shall fall in the scope of protection of the present disclosure.

When recommending information of other users to a user based on information such as age, gender, and geographical location of the user, a server may recommend a large number of other users. If all the recommended users send messages to the user, the user may be seriously bothered. The large number of other users recommended by the server may include a malicious user and the malicious user may bring fraud and harassment to the user. As can be known, since reference of user information recommended based on age, gender and geographical location of the user is relatively poor, it is very difficult for the user to know real friends with whom the user has common topics from the other users recommended as above. Based on this, an example of the present disclosure provides a method and a device for recommending user information, which will be described below through examples.

Examples of the present disclosure provide a method of recommending user information. By this method, consumption behavior of a user and information recommendation may be combined together to recommend other users having similar consumption tastes and life styles to the user. Also, cost at which a malicious user makes frauds and malicious harassments may be increased by limiting the consumption behavior, thereby reducing possibility of recommending a malicious user.

Figure 1:
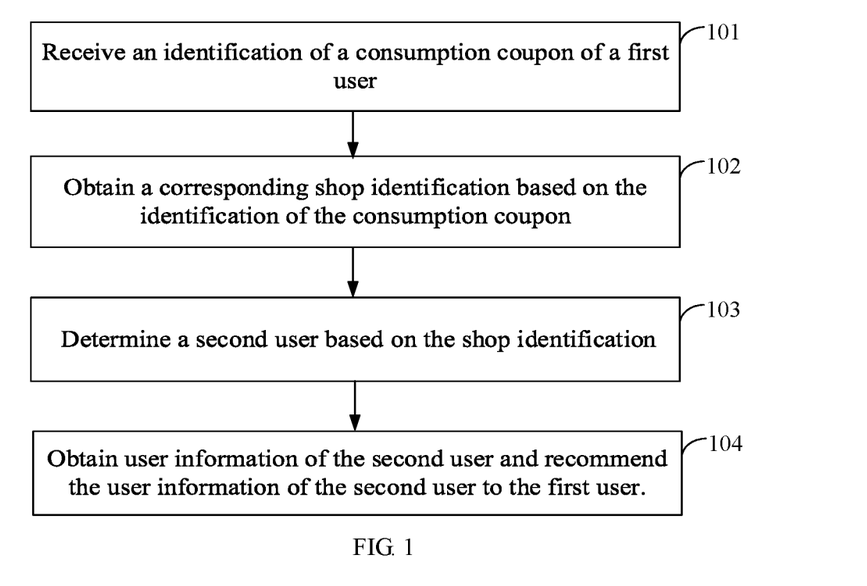
FIG. 1 is a flowchart illustrating a method of recommending user information according to an example of the present disclosure.

As shown in FIG. 1, the method may include the following steps 101-104.

At step 101, an identification of a consumption coupon of a first user is received.

An executing subject of an example of the present disclosure may be a server. The server may be a server of a third-party shopping platform, a server of an online group shopping platform, a server of an entity shop or the like. The above consumption coupon may be a physical coupon, an electronic coupon issued online or the like.

The server may store a consumption coupon list. The consumption coupon list may include a corresponding relationship among an identification of a consumption coupon, denomination of the consumption coupon and a shop identification. When a new consumption coupon is issued, the server may store an identification of the consumption coupon, denomination of the consumption coupon and a shop identification of a shop corresponding to the consumption coupon in the consumption coupon list.

When the first user obtains a consumption coupon, the first user may send a friend recommendation request to the server. The friend recommendation request may include an identification of the consumption coupon and a user identification of the user. When receiving the friend recommendation request from the first user, the server may obtain the identification of the consumption coupon from the friend recommendation request.

At present, a user may not pay a fee when obtaining a consumption coupon from a third-party shopping platform, an online group-buying platform or the like, but make a payment when using the consumption coupon in a shop corresponding to the consumption coupon. Thus, for increasing the cost of recommending a friend and thus lowering the possibility of recommending a malicious user, a user is allowed to perform friend recommendation only when the user uses the consumption coupon and makes a payment in the shop according to an example of the present disclosure.

For example, when the first user obtains a consumption coupon and makes a payment in a shop corresponding to the consumption coupon, the first user presents the consumption coupon to a shop assistant of the shop. The shop assistant of the shop may perform authentication for the consumption coupon by using a coupon-authenticating terminal of the shop. When the consumption coupon is authenticated, if the consumption coupon is an electronic coupon, the coupon-authenticating terminal may scan the electronic coupon or the shop assistant may input an identification of the electronic coupon into the coupon-authenticating terminal and then the coupon-authenticating terminal sends an authentication request to a server, where the authentication request includes the identification of the electronic coupon. If the consumption coupon is a physical coupon, the coupon-authenticating terminal may obtain an identification of the physical coupon by scanning a bar code, a two-dimensional code or the like on the physical coupon. The coupon-authenticating terminal may send an authentication request to the server, where the authentication request includes the identification of the physical coupon.

At this time, the server receives an authentication request from the coupon-authenticating terminal, obtains the identification of the consumption coupon from the authentication request, performs authentication for the consumption coupon and feeds back an authentication result to the coupon-authenticating terminal. The specific authentication process will not be described herein.

In an example of the present disclosure, when the first user obtains a consumption coupon, the server may also obtain a consumption-coupon-denomination corresponding to the consumption coupon from a consumption coupon list based on the identification of the consumption coupon. Based on the consumption-coupon-denomination and a preset single-time recommended quota, the server may determine a recommended number of times corresponding to the first user. Shop association information corresponding to the first user may be generated based on the user identification of the first user, a shop identification and the recommended number of times. According to an example of the present disclosure, the user identification of the first user, the shop identification and the recommended number of times may be directly formed into the shop association information corresponding to the first user.

The above preset single-time recommended quota may be 5, 10 or the like, which is not limited herein and can be set based on actual needs in practical operation.

When the recommended number of times corresponding to the first user is determined, a ratio between the consumption-coupon-denomination and the preset single-time recommended quota may be determined as the recommended number of times corresponding to the first user. For example, if the consumption-coupon-denomination is 50 and the preset single-time recommended quota is 5, the recommended number of times is 10.

In an example of the present disclosure, the server may also store a shop association list of respective shops. The shop association list stores shop association information of all users who make payments in the shop. After the shop association information corresponding to the first user is generated as above, the shop association information corresponding to the first user may also be stored in the shop association list corresponding to the above shop identification. It is assumed that the user identification of the first user is User1, the shop identification of the shop corresponding to the consumption coupon is shop1 and the recommended number of times corresponding to the first user is 10, the shop association list corresponding to the shop may be shown as Table 1.

TABLE 1

| User identification | Shop identification | Recommended number of times |
|---|---|---|
| User1 | shop1 | 10 |
| User2 | shop1 | 1 |
| User3 | shop1 | 5 |
| User4 | shop1 | 30 |
| ... | ... | ... |

At step 102, a corresponding shop identification is obtained based on the identification of the consumption coupon.

After receiving the identification of the consumption coupon of the first user, the server may obtain the stored consumption coupon list and then query the shop identification corresponding to the identification of the consumption coupon from the consumption coupon list based on the identification of the consumption coupon.

At step 103, a second user is determined based on the shop identification.

The shop association list corresponding to the shop identification is invoked based on the shop identification. The corresponding second user may be determined from the shop association list based on a customized rule corresponding to the first user.

The customized rule corresponding to the first user may be a friend matching rule set by the first user when registering with the server. The customized rule may be stored in account information of the first user. Further, the customized rule may specify gender, age, and number of recommended friends and so on. When determining the second user to be recommended from the shop association list, the customized rule corresponding to the first user may be firstly obtained from the account information of the first user based on the user identification of the first user and a second user who satisfies the customized rule may be then determined from users other than the first user in the shop association list.

After determining the second user to be recommended, in the shop association list corresponding to the above shop identification, the server may perform an operation of subtracting 1 from recommended number of times in shop association information corresponding to the second user. It is determined whether the recommended number of times corresponding to the second user after the operation of subtracting 1 is 0. If yes, the shop association information corresponding to the second user may be deleted from the shop association list.

For example, if it is determined that the user identification of the second users to be recommended is respectively User2 and User3 in Table 1, 1 is subtracted from the recommended number of times 1 and 5 respectively corresponding to the User2 and User3. The recommended number of times corresponding to User2 after the operation of subtracting 1 is 0 and the recommended number of times corresponding to User3 after the operation of subtracting 1 is 4. The shop association information corresponding to User2 may be deleted from the shop association list as shown in Table 2.

TABLE 2

| User identification | Shop identification | Recommended number of times |
|---|---|---|
| User1 | shop1 | 10 |
| User3 | shop1 | 4 |
| User4 | shop1 | 30 |
| ... | ... | ... |

Since some users may not make payments any longer in a shop after making several payments in the shop, a possibility that the first user actually meets with the recommended second user may be reduced due to presence of this kind of users. By subtracting 1 from the recommended number of times of the recommended second user, the recommended number of times of the second user may be reduced more quickly and the second users making few payments are reduced, thereby increasing the possibility that the first user actually meets with the recommended second user. Further, if the recommended number of times of the recommended second user is 0 after being reduced by 1, participation in a friend recommendation may be allowed only when another payment is made in the shop. In this way, more users are encouraged to make payments continuously in the shop.

In an example of the present disclosure, in addition to the manner of subtracting 1 only from the recommended number of times of the recommended second user as above, 1 may also be subtracted only from the recommended number of times of the first user who obtains user information of recommended friends. Alternatively, 1 may be also subtracted from both the recommended number of times of the recommended second user and the recommended number of times of the first user who obtains the recommended user information at the same time.

Since the recommended number of times is determined based on a consumption-coupon-denomination and shop association information of a user is deleted from a shop association list after the recommended number of times of the user is reduced to 0, the user can participate in friend recommendation only when making another payment in the shop. In this way, it is guaranteed that all recommended users can make payments in the shop in a short period, thereby increasing the possibility that the user meets with the recommended user in the shop. Further, the recommended user and the user may have similar consumption tastes and lifestyles. In addition, since participation in a friend recommendation can be allowed only when a payment is made, the possibility of recommending a malicious user is effectively reduced.

At step 104, user information of the second user is obtained and then recommended to the first user.

In an example of the present disclosure, the server may record historic shop information corresponding to a user in account information of the user. The historic shop information may include relevant information such as a shop identification, a shop address, paying time and so on of a shop in which the user makes payments previously.

After determining the second user to be recommended, the server may obtain a user identification of the determined second user and the historic shop information corresponding to the second user. The user information of the second user may be generated based on the user identification of the second user and the corresponding historic shop information. The user information of the second user and a preset displaying manner is sent to the first user, where the preset displaying manner may include a flop animation manner or a ripple gradient animation manner.

The server may obtain the historic shop information corresponding to the second user from account information of the second user based on the user identification of the determined second user. The server may take the user identification of the second user and the obtained historic shop information as user information of the second user. The user information of the second user may further include other information such as age and gender of the second user.

After the server sends the user information of the second user and the preset displaying manner to the first user, the first user may display the user information of the recommended second user in the preset displaying manner. The server may also not send the above preset displaying manner to the first user but allow the first user to customize a displaying manner on a terminal. In an example of the present disclosure, the recommended friends may be displayed in the preset displaying manner such as the flop animation manner or the ripple gradient animation manner, thereby increasing the fun of the recommended user information and improving the user experience.

In an example of the present disclosure, after the user information of the second user is recommended to the first user, a current position of the second user may also be determined. When the current position of the second user is determined as the shop corresponding to the above shop identification, chance encounter prompting information may be sent to the first user and the second user.

The server may obtain the current position of the second user by locating the recommended second user by using Global Positioning System (GPS). Alternatively, the server may directly request the current position of the second user from the second user. When the current position of the second user is determined as the shop corresponding to the above shop identification, because the first user is making a payment by authenticating a coupon in the shop, it is determined that both the second user and the first user are in the shop at the same time. In this case, the chance encounter prompting information may be sent to the first user and the second user. The chance encounter prompting information may include the user information of the first user, the user information of the second user, text information for prompting the chance encounter and so on.

The method provided by examples of the present disclosure may be applied in many application scenarios and only several application scenarios are exemplified below. However, the application scenarios of the method of recommending user information are not limited in the examples of the present disclosure. For example, when a user buys an electronic coupon on a group-buying website and makes a payment by having the coupon authenticated in an entity shop corresponding to the electronic coupon, a server of the group-buying website may associate the user with the entity shop, and recommend other users who also make payments by having coupons authenticated in the entity shop to the user by the method provided in examples of the present disclosure. In another example, after the user buys a commodity on a third-party shopping platform, a server of the third-party shopping platform may associate the user with an online shop corresponding to the commodity, and recommend other users who also make payments on the online shop to the user by the method provided in examples of the present disclosure. In still another example, when the user makes payments in an entity site such as a cinema, a sports ground, a fitness house, a playground, a concert or the like, a server of the entity site may associate the user with the entity site, and recommend other users who also make payments in the site to the user by the method provided in examples of the present disclosure.

In an example of the present disclosure, by combining making payments by having a coupon authenticated and recommending friends, participation in friend recommendation is allowed only when a payment is made. In this way, cost of participating in a friend recommendation is increased, which effectively reduces malicious users participating in the friend recommendation, frauds caused by the friend recommendation to a user and harassments caused by junk advertisements to the user. In addition, users going to a same shop for shopping may live in geographical locations that are close to each other and the users are extremely likely to have similar consumption tastes and lifestyles. Thus, the reference of friend information recommended by the method provided in the present disclosure may be very good and a user may know real friends with whom the user has common topics from recommended other users. Further, when the user is making a payment in a shop, if it is determined that the recommended other users are also in the shop, chance encounter prompting information may be sent to the user and the recommended other users, thereby increasing possibility that the user actually meets with the recommended other users.

In an example of the present disclosure, an identification of a consumption coupon of a first user is received; a corresponding shop identification is determined based on the identification of the consumption coupon; a second user is determined based on the shop identification; user information of the second user is recommended to the first user. When an identification of a consumption coupon of the first user in a shop is received, the second users of the shop are recommended to the first user. The second users are users making payments in the shop. Therefore, the recommended number of the second users is limited and the second users are extremely likely to have consumption tastes and lifestyles similar to those of the first user. Due to consumption limitation, the possibility of recommending malicious users to the first user may be reduced, thereby improving the reference of recommended user information. The first user may know real friends with whom the first user has common topics from the recommended user information.

Figure 2:
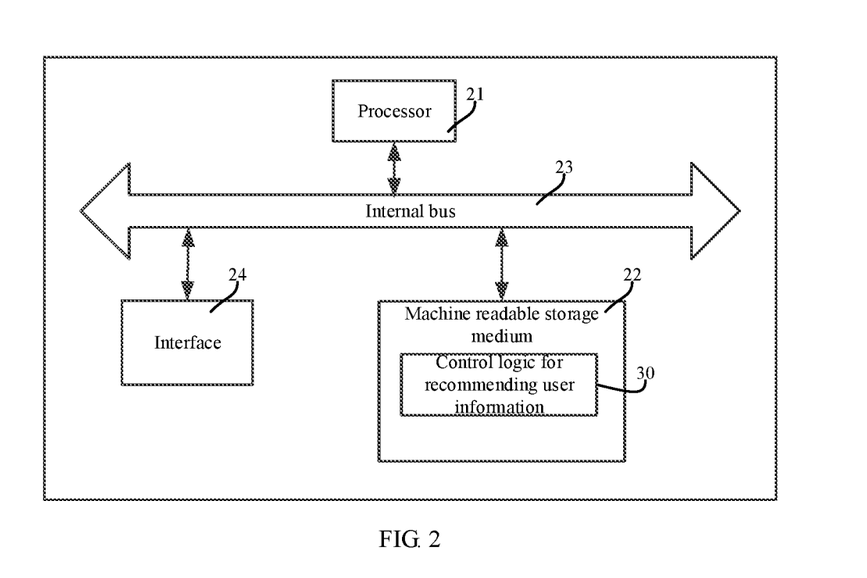
FIG. 2 is a schematic diagram illustrating a hardware structure of a device for recommending user information according to an example of the present disclosure.

As shown in FIG. 2, it is a schematic diagram illustrating a hardware structure of a device for recommending user information according to an example of the present disclosure. The device is used to perform the method of recommending user information provided by the above examples of the present disclosure. The device for recommending user information may include a processor 21 and a machine readable storage medium 22. Where, the processor 21 and the machine readable storage medium 22 are generally coupled with each other by via an internal bus 23. In other possible implementations, the device for recommending user information may also include an external interface 24 to enable communication with other devices or components.

In different examples, the machine readable storage medium 22 may be: RAM (Radom Access Memory), volatile memory, non-volatile memory, flash memory, storage drive (eg, hard disk drive).), SSDs, any type of storage disks (eg, optical disks, DVDs, etc.), or similar storage media, or combinations thereof.

Figure 3A:
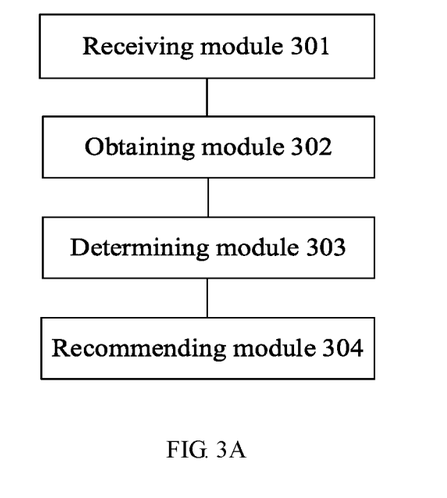
FIG. 3A is a schematic diagram illustrating a functional module of a control logic for recommending user information according to an example of the present disclosure.

Further, the machine readable storage medium 22 may store machine readable instructions corresponding to a control logic 30 for recommending user information executed by the processor 21. In this way, when the processor 21 reads and executes the machine readable instructions stored on the machine readable storage medium 22, the processor 21 may execute the method of recommending user information as described above. Divided by the function, as shown in FIG. 3A, the control logic 30 for recommending user information may include a receiving module 301, an obtaining module 302, a determining module 303 and a recommending module 304.

The receiving module 301 may be configured to receive an identification of a consumption coupon of a first user.

The obtaining module 302 may be configured to obtain a corresponding shop identification based on the identification of the consumption coupon.

The determining module 303 may be configured to determine a second user based on the shop identification.

The recommending module 304 may be configured to obtain user information of the second user and recommend the user information of the second user to the first user.

The above obtaining module 302 may be configured to obtain a stored consumption coupon list, and query a shop identification corresponding to the consumption coupon in the consumption coupon list based on the identification of consumption coupon.

In an example of the present disclosure, the determining module 303 may be configured to invoke a shop association list corresponding to the shop identification based on the shop identification, and determine the second user from the shop association list based on a customized rule corresponding to the first user.

In an example of the present disclosure, the control logic 30 for recommending user information further includes a shop association information generating module and a storage module.

The shop association information generating module may be configured to determine a consumption-coupon-denomination corresponding to the consumption coupon based on the identification of the consumption coupon; determine a recommended number of times corresponding to the first user based on the consumption-coupon-denomination and a preset single-time recommended quota; and generate shop association information corresponding to the first user based on the user identification of the first user, the shop identification and the recommended number of times.

The storage module may be configured to store the shop association information corresponding to the first user in the shop association list corresponding to the shop identification.

Figure 3B:
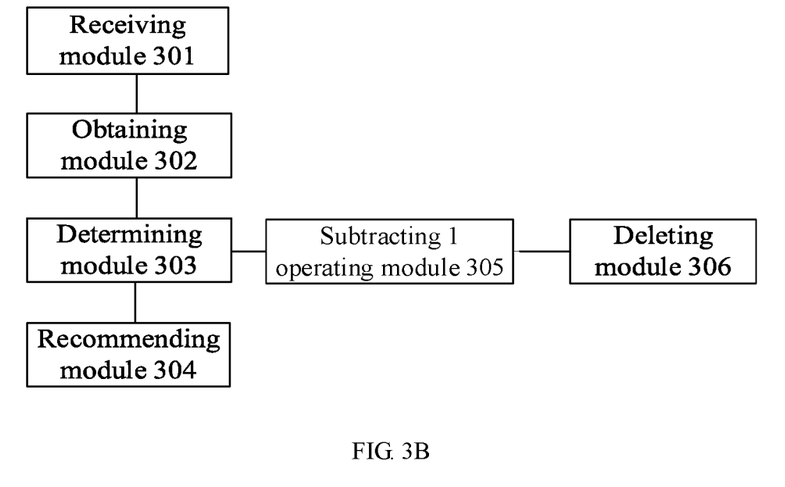
FIG. 3B is a schematic diagram illustrating a functional module of a control logic for recommending user information according to another example of the present disclosure.

When the determining module 303 determines the corresponding second user, the control logic 30 for recommending user information may be used to update the shop association list corresponding to the shop identification through a subtracting 1 operating module 305 and a deleting module 306 as follows.

The subtracting 1 operating module 305 may be configured to subtract 1 from a recommended number of times in shop association information corresponding to the second user from the shop association list corresponding to the shop identification. The deleting module 306 may be configured to determine whether the recommended number of times corresponding to the second user after an operation of subtracting 1 is 0, and if yes, delete the shop association information corresponding to the second user from the shop association list.

In an example of the present disclosure, the recommending module 304 may be configured to obtain a user identification of the second user and historic shop information corresponding to the second user; generate the user information of the second user based on the user identification of the second user and the historic shop information; and send the user information of the second user and a preset displaying manner to the first user. Where the preset displaying manner includes a flop animation manner and a ripple gradient animation manner.

After the recommending module 304 recommends the user information of the second user to the first user, the control logic 30 for recommending user information may be configured to determine whether the recommended second user meets the first user, and when it is determined that the recommended second user meets the first user, send chance encounter prompting information to the first user and the second user through a sending module as follows.

The sending module may be configured to determine a current position of the second user; and send chance encounter prompting information to the first user and the second user when it is determined that the current position of the second user as a shop corresponding to the shop identification.

In examples of the present disclosure, an identification of a consumption coupon of a first user is received; a corresponding shop identification is obtained based on the identification of the consumption coupon; a second user is determined based on the shop identification; user information of the second user is obtained; and the user information of the second user is recommended to the first user. When the first user makes a payment by having the coupon authenticated in the shop, the second users who are making payments or made payments in the shop are recommended to the first user. Therefore, the recommended number of the second users is limited and the second users are likely to have consumption tastes and lifestyles similar to those of the first user. Due to consumption limitation, the possibility of recommending malicious users to a user may be reduced, thereby improving the reference of recommended user information. In this way, the user may know real friends with whom the user has common topics from the recommended users.

In the following, software implementation is taken as an example to further describe how the device for recommending user information executes the control logic 30 for recommending user information. In this example, the control logic in the present disclosure may be understood as machine readable instructions stored on the machine readable storage medium 22. When the processor 21 on the device for recommending user information of the present disclosure executes the control logic, by invoking machine readable instructions stored on the machine readable storage medium 22, the processor is caused to:

receive an identification of a consumption coupon of a first user;

obtain a corresponding shop identification based on the identification of the consumption coupon;

determine a second user based on the shop identification;

obtain user information of the second user; and recommend the user information of the second user to the first user.

In this example, when obtaining the corresponding shop identification based on the identification of the consumption coupon, the machine readable instructions stored on the machine readable storage medium 22 cause the processor 21 to:

obtain a stored consumption coupon list; and query a shop identification corresponding to the consumption coupon in the consumption coupon list based on the identification of consumption coupon.

In this example, when determining the second user based on the shop identification, the machine readable instructions stored on the machine readable storage medium 22 cause the processor 21 to:

invoke a shop association list corresponding to the shop identification based on the shop identification; and determine the second user from the shop association list based on a customized rule corresponding to the first user.

In this example, the machine readable instructions stored on the machine readable storage medium 22 cause the processor 21 to:

determine a consumption-coupon-denomination corresponding to the consumption coupon based on the identification of the consumption coupon;

determine a recommended number of times corresponding to the first user based on the consumption-coupon-denomination and a preset single-time recommended quota;

generate shop association information corresponding to the first user based on the user identification of the first user, the shop identification and the recommended number of times; and store the shop association information corresponding to the first user in the shop association list corresponding to the shop identification In this example, the machine readable instructions stored on the machine readable storage medium 22 cause the processor 21 to:

subtract 1 from a recommended number of times in shop association information corresponding to the second user from the shop association list corresponding to the shop identification;

determine whether the recommended number of times corresponding to the second user after an operation of subtracting 1 is 0; and if yes, delete the shop association information corresponding to the second user from the shop association list.

In this example, when obtaining the user information of the second user and recommending the user information of the second user to the first user, the machine readable instructions stored on the machine readable storage medium 22 cause the processor 21 to:

obtain a user identification of the second user and historic shop information corresponding to the second user;

generate the user information of the second user based on the user identification of the second user and the historic shop information; and send the user information of the second user and a preset displaying manner to the first user, wherein the preset displaying manner comprises a flop animation manner and a ripple gradient animation manner.

In this example, the machine readable instructions stored on the machine readable storage medium 22 cause the processor 21 to:

determine a current position of the second user; and send chance encounter prompting information to the first user and the second user when it is determined that the current position of the second user as a shop corresponding to the shop identification.

The control logic for recommending user information in examples of the present disclosure may be a particular hardware on a device or a software or firmware mounted on the device or the like. It can be clearly understood by those skilled in the art that, for convenience and simplicity of description, the specific working processes of the above modules and units may be referred to corresponding processes in the above method examples.

In several examples provided by the present disclosure, it is appreciated that methods and devices disclosed herein may be implemented in other manners. The device examples described above are merely illustrative. For example, units are divided only as a logic function and may be divided in another manner in actual implementation. For another example, a plurality of units or components may be combined or integrated into another system or some features may be neglected or not executed. Further, mutual coupling, direct coupling or communication connection shown or discussed herein may be indirect coupling or communication connection between devices or units via some communication interfaces and may also be in electric, mechanic or other forms.

The units described as separate members may be or not be physically separated, and the members displayed as units may be or not be physical units, i.e., may be located in one place, or may be distributed to a plurality of network units. Part or all of the units may be selected according to actual requirements to implement the objectives of the solutions in the examples.

Further, different functional units in different examples of the present disclosure may be integrated into one processing unit, may also exist physically as a separate unit. Also, two or more units may be integrated into one unit.

The functions, if implemented in the form of software functional units and sold or used as independent products, may be stored in a machine readable storage medium. Based on such understanding, the technical scheme of the present disclosure essentially or a part contributing to the prior art or part of the technical scheme may be embodied in the form of a software product, the software product is stored in a storage medium, and includes several instructions for enabling a computer device (such as a personal computer, a server or a network device) to execute all or part of the steps of the method disclosed by the examples of the present disclosure. The above storage mediums include various mediums such as a USB disk, a mobile hard disk, a read-only memory (ROM), a random access memory (RAM), a diskette or a optical disk and the like which may store program codes.

It shall be noted that the relational terms such as "first" and "second" used herein are merely intended to distinguish one entity or operation from another entity or operation, rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above contents are merely detailed description of the present disclosure to which the scope of protection of the present disclosure is not limited. Any changes or substitutions that easily occur to those skilled in the art in the technical scope of the present disclosure should fall in the scope of protection of the present disclosure. Therefore, the scope of protection of the present disclosure is indicated as in appended claims.

The invention claimed is:

1. A method of recommending user information, comprising:

receiving, by a server, a friend recommendation request for requesting the server to recommend a friend to a first user from the first user, wherein the friend recommendation request comprises identification of a consumption coupon of the first user and a user identification of the first user;

obtaining, by the server, a corresponding shop identification from a locally-stored consumption coupon list based on the identification of the consumption coupon in response to the friend recommendation request;

associating, by the server, the first user and the shop identification, and generating shop association information corresponding to the first user based on user identification of the first user and the shop identification;

storing, by the server, the shop association information in a shop association list corresponding to the shop identification;

determining, by the server, a second user from the shop association list based on the shop identification;

obtaining, by the server, user information of the second user, wherein the user information comprises a user identification of the second user; and sending, by the server, the user information of the second user and a preset displaying manner to the first user, wherein the determining of the second user from the shop association list based on the shop identification comprises:

acquiring, by the server, a friend matching rule set by the first user when registering with the server, from account information of the first user stored in the server according to the user identification of the first user, wherein the friend matching rule specifies gender, age, and number of recommended friends;

invoking, by the server, the shop association list corresponding to the shop identification based on the shop identification; and searching, by the server, the shop association list to determine the second user corresponding to the friend matching rule;

wherein the shop association information corresponding to the first user further comprises a recommended number of times corresponding to the first user, and the method further comprising:

determining, by the server, a consumption-coupon-denomination corresponding to the consumption coupon based on the identification of the consumption coupon;

determining, by the server, the recommended number of times corresponding to the first user based on the consumption-coupon-denomination and a preset single-time recommended quota;

subtracting, by the server, 1 from a recommended number of times in shop association information corresponding to the second user from the shop association list corresponding to the shop identification;

determining, by the server, whether the recommended number of times corresponding to the second user after an operation of subtracting 1 is 0;

if the recommended number of times corresponding to the second user after operation of subtracting 1 is 0, deleting the shop association information corresponding to the second user from the shop association list;

determining, by the server, a current position of the second user; and sending, by the server, chance encounter prompting information to the first user and the second user when it is determined that the current position of the second user as a shop corresponding to the shop identification.

2. The method according to claim 1, wherein obtaining the corresponding shop identification from the locally-stored consumption coupon list based on the identification of the consumption coupon comprises:

querying, by the server, a shop identification corresponding to the consumption coupon in the consumption coupon list based on the identification of the consumption coupon.

3. The method according to claim 1, wherein obtaining the user information of the second user and sending the user information of the second user to the first user comprises:

obtaining, by the server, the user identification of the second user and historic shop information corresponding to the second user;

generating, by the server, the user information of the second user based on the user identification of the second user and the historic shop information; and sending, by the server, the user information of the second user and a preset displaying manner to the first user, wherein the preset displaying manner comprises a flop animation manner and a ripple gradient animation manner.

4. A device for recommending user information, the device comprising:

a processor which invokes machine readable instructions corresponding to a control logic for recommending user information stored on a storage medium and executes the machine readable instructions to:

receive a friend recommendation request for requesting the device to recommend a friend to a first user from the first user, wherein the friend recommendation request comprises identification of a consumption coupon of the first user and a user identification of the first user;

obtain a corresponding shop identification from a locally-stored consumption coupon list based on the identification of the consumption coupon in response to the friend recommendation request;

associate the first user and the shop identification, and generate shop association information corresponding to the first user based on user identification of the first user and the shop identification;

store the shop association information in a shop association list corresponding to the shop identification;

determine a second user from the shop association list based on the shop identification;

obtain user information of the second user, wherein the user information comprises a user identification of the second user; and send the user information of the second user to the first user, wherein determining the second user from the shop association list based on the shop identification comprises:

acquiring a friend matching rule set by the first user when registering with the device, from account information of the first user stored in the device according to the user identification of the first user, wherein the friend matching rule specifies gender, age, and number of recommended friends;

invoking the shop association list corresponding to the shop identification based on the shop identification; and searching the shop association list to determine the second user corresponding to the friend matching rule;

wherein the shop association information corresponding to the first user further comprises a recommended number of times corresponding to the first user, and the machine readable instructions cause the processor to:

determine a consumption-coupon-denomination corresponding to the consumption coupon based on the identification of the consumption coupon;

determine the recommended number of times corresponding to the first user based on the consumption-coupon-denomination and a preset single-time recommended quota subtract 1 from a recommended number of times in shop association information corresponding to the second user from the shop association list corresponding to the shop identification;

determine whether the recommended number of times corresponding to the second user after an operation of subtracting 1 is 0;

if the recommended number of times corresponding to the second user after operation of subtracting 1 is 0, delete the shop association information corresponding to the second user from the shop association list;

determine a current position of the second user; and send chance encounter prompting information to the first user and the second user when it is determined that the current position of the second user as a shop corresponding to the shop identification.

5. The device according to claim 4, wherein when obtaining the corresponding shop identification from the locally-stored consumption coupon list based on the identification of the consumption coupon, the machine readable instructions cause the processor to:

query a shop identification corresponding to the consumption coupon in the consumption coupon list based on the identification of the consumption coupon.

6. The device according to claim 4, wherein when obtaining the user information of the second user and sending the user information of the second user to the first user, the machine readable instructions cause the processor to:

obtain the user identification of the second user and historic shop information corresponding to the second user;

generate the user information of the second user based on the user identification of the second user and the historic shop information; and send the user information of the second user and a preset displaying manner to the first user, wherein the preset displaying manner comprises a flop animation manner and a ripple gradient animation manner.

7. A non-transitory machine readable storage medium storing machine readable instructions executed by one or more processors, the machine readable instructions cause the processors to perform the method of recommending user information according to claim 1.

* * * * *